United States Patent [19]

Etoh et al.

[11] Patent Number: 5,025,379
[45] Date of Patent: Jun. 18, 1991

[54] SYSTEM AND METHOD FOR AUTOMATICALLY CONTROLLING VEHICLE SPEED TO DESIRED CRUISE SPEED USING MICROCOMPUTER

[75] Inventors: Yoshiyuki Etoh; Hiroshi Inoue; Kazuyuki Mori; Koichi Suzuki; Kinichiro Nakano; Hiroyuki Nomura; Isao Yamamoto; Kiyoshi Yoshida, all of Kanagawa, Japan

[73] Assignee: Nissan Motor Company, Limited, Yokohama, Japan

[21] Appl. No.: 263,758

[22] Filed: Oct. 28, 1988

[30] Foreign Application Priority Data

Oct. 29, 1987 [JP] Japan .................. 62-273935

[51] Int. Cl.$^5$ .............................................. B60K 31/00
[52] U.S. Cl. .................................. 364/426.04; 180/179
[58] Field of Search ................. 364/426.04; 324/161; 180/170, 179; 123/352

[56] References Cited

U.S. PATENT DOCUMENTS

| | | | |
|---|---|---|---|
| 4,434,469 | 2/1984 | Suzuki et al. | 364/426.04 |
| 4,479,184 | 10/1984 | Nakano | 364/426.04 |
| 4,484,279 | 11/1984 | Muto | 364/426.04 |
| 4,539,642 | 9/1985 | Mizuno et al. | 364/426.04 |
| 4,540,060 | 9/1985 | Kawata et al. | 180/179 |
| 4,553,621 | 11/1985 | Hyodo et al. | 180/179 |
| 4,646,861 | 3/1987 | Kawata et al. | 180/176 |
| 4,797,826 | 1/1989 | Onogi et al. | 364/426.04 |

FOREIGN PATENT DOCUMENTS 60-42131  3/1985  Japan .

Primary Examiner—Thomas G. Black
Attorney, Agent, or Firm—Foley & Lardner, Schwartz, Jeffery, Schwaab, Mack, Blumenthal & Evans

[57] ABSTRACT

A system and method for automatically controlling a vehicle speed to a desired cruise speed are disclosed in which whether a microcomputer of a control unit is enabled to perform a cruise speed control is determined on the basis of a plurality of determining factors and a power supply of a throttle actuator for actuating an engine throttle valve so as to adjust an opening angle of the throttle valve is enabled only when all of the determining factors satisfy a condition of enabling the cruise speed control via the actuator and is disabled when at least one of the determining factors does not satisfy the condition.

16 Claims, 1 Drawing Sheet

SYSTEM AND METHOD FOR AUTOMATICALLY CONTROLLING VEHICLE SPEED TO DESIRED CRUISE SPEED USING MICROCOMPUTER

BACKGROUND OF THE INVENTION

1. Field of the Invention

The present invention relates to a system and method for automatically controlling a vehicle speed to a desired cruise speed using a microcomputer in which a power supply to an actuator for actuating an engine driving torque adjusting mechanism is enabled only when all of a plurality of factors of determining whether a cruise control can be carried out satisfy a condition to enable the cruise speed control to execute.

2. Background of the Art

A Japanese Patent Application First Publication No. Sho 60-42131 published on Mar. 6, 1985 exemplifies one of previously proposed systems for automatically controlling a vehicle speed to a desired cruise speed applied to automotive vehicles.

In the previously proposed automatic cruise speed controlling system, an actuator for actuating an engine throttle valve so as to adjust an opening angle thereof is controlled by means of a control unit in accordance with a command issued from a command generating unit (having a plurality of switches through an operation of one of the switches) so that a current speed coincides with a set cruise speed at which the vehicle is desired to cruise.

As recent trends, the control unit includes a microcomputer to meet the demand of small-sized, high performance control unit.

In addition, in such a previously proposed automatic cruise speed controlling system as described above, when a brake pedal is depressed or clutch pedal is depressed and an operation signal indicating that the brake or clutch pedal is operated is produced during the cruise run controlled by the system, the power supply to the throttle actuator is inhibited in response to the operation signal. Thus, the cruise control operation using the control unit is released. At this time, the vehicle speed can be decreased unless the driver depresses an accelerator pedal. Furthermore, when the brake pedal is released or the clutch pedal is released and one command from the command generating unit is issued to the control unit, the power supply to the actuator is resumed to carry out the cruise operation in accordance with the command issued from the command generating unit.

SUMMARY OF THE INVENTION

It is an object of the present invention to provide an improved system and method for automatically controlling a vehicle speed to a desired cruise speed in which a power supply to an actuator for actuating a vehicular engine driving force adjusting mechanism is carried out only when whether a microcomputer constituting the automatic cruise speed controlling system can execute a cruise speed control is determined from a plurality of determining factors and all of these determining factors satisfy a condition that the microcomputer can execute the cruise speed control, and thus an optimum control of the vehicle speed and a power saved system can be achieved.

The above-described object can be achieved by providing a system for a vehicle, comprising: (a) first means for detecting a current vehicle speed; (b) second means having a plurality of command switches for operatively outputting command signals on a cruise speed run of the vehicle, respectively; (c) a microcomputer, responsive to any one of the command signals from the second means, for outputting a control command signal through each of a plurality of output ports thereof according to the corresponding one of the contents of the command signals, the microcomputer outputting a cruise signal through another output port together with the control command signals and outputting a receipt signal through still another output port upon receipt of any one of the command signals from the second means (d) fourth means having a plurality of control valves for, with a power supply therefor being received, adjusting an operating variable of a vehicular engine driving force adjusting mechanism according to the contents of the control command signals outputted from the microcomputer via the respective output ports so that the current vehicle speed is controlled in accordance with the corresponding one of the contents of the command signals from the second means; (e) fifth means for determining whether any one of the command signals is outputted from the second means and thereafter the microcomputer outputs the receipt signal through the still other output port; (f) sixth means for determining whether the microcomputer falls in a cruise speed control enable state on the basis of a plurality of determining factors, the factors determining that the microcomputer enables the cruise speed control and the factors including the determination result by the fifth means that any one of the command signal is outputted and thereafter the microcomputer outputs the receipt signal through the still other output port; and (g) seventh means for enabling the power supply to the fourth means only when all of the determining factors satisfy a condition of enabling the power supply to the fourth means to execute a cruise speed control via the fourth means.

The above-described object can also be achieved by providing a system for a vehicle, comprising: (a) first means for detecting a current vehicle speed; (b) second means includes a first command switch through which the current vehicle speed is set as a cruise speed at which the vehicle is desired to cruise and which outputs a first command signal to command the contents thereof, a second command switch through which the current cruise speed set through the first switch is increased at a constant change rate of the vehicle speed to another cruise speed at which the vehicle is desired to cruise and which outputs a second command signal to command the contents thereof, and a third command switch through which the current vehicle speed is again returned to the original cruise speed before a system operation is released and which outputs a third command signal to command the contents thereof; (c) a microcomputer, responsive to any one of the first, second, and third command signals from the second means, for outputting a control command signal through each of a plurality of output ports thereof according to the corresponding one of the contents of the first, second, and third command signals, the microcomputer outputting a cruise signal through another output port together with the control command signals and outputting a receipt signal through still another output port upon receipt of any one of the first, second, and third command signals from the second means in accordance with the corresponding one of the contents of the first, second, and third command signals; (e) fifth means for determining whether any one of the first, second, and third command signals is outputted from the second means and thereafter the microcomputer outputs the receipt signal through the still other output port; (f) sixth means for determining whether the microcomputer falls in a cruise speed control enable state on the basis of a plurality of determining factors, the factors determining that the microcomputer enables the cruise speed control and the factors including the determination result by the fifth means that any one of the first, second, and third command signal is outputted and thereafter the microcomputer outputs the receipt signal through the still other output port; and (g) seventh means for selectively enabling the power supply to the fourth means only when all of the determining factors satisfy a condition of enabling the power supply to the fourth means to execute a cruise speed control via the fourth means and selectively disabling the power supply to the fourth means when at least one of the determining factors does not satisfy the condition.

The above-described object can also be achieved by providing a method for automatically controlling a vehicle speed to a desired cruise speed, comprising the steps of: (a) detecting the current vehicle speed; (b) operatively outputting command signals on a cruise speed run of the vehicle, respectively; (c) providing a microcomputer, responsive to any one of the command signals, for outputting a control command signal through each of a plurality of output ports thereof according to the corresponding one of the contents of the command signals, the microcomputer outputting a cruise signal through another output port together with the control command signals and outputting a receipt signal through still another output port upon receipt of any one of the command signals (d) providing a plurality of control valves for, with a power supply therefor being received, adjusting an operating variable of a vehicular engine driving force adjusting mechanism according to the contents of the control command signals outputted from the microcomputer via the respective output ports so that the current vehicle speed is controlled in accordance with the corresponding one of the contents of the command signals; (e) determining whether any one of the command signals is outputted and thereafter the microcomputer outputs the receipt signal through the still other output port; (f) determining whether the microcomputer falls in a cruise speed control enable state on the basis of a plurality of determining factors, the factors determining that the microcomputer enables the cruise speed control and the factors including the determination result in the step (e) that any one of the command signal is outputted and thereafter the microcomputer outputs the receipt signal through the still other output port; and (g) enabling the power supply to the control valves only when all of the determining factors satisfy a condition of enabling the power supply to the control valves to execute a cruise speed control via the control valves.

DETAILED DESCRIPTION OF THE PREFERRED EMBODIMENT

Figure 1:
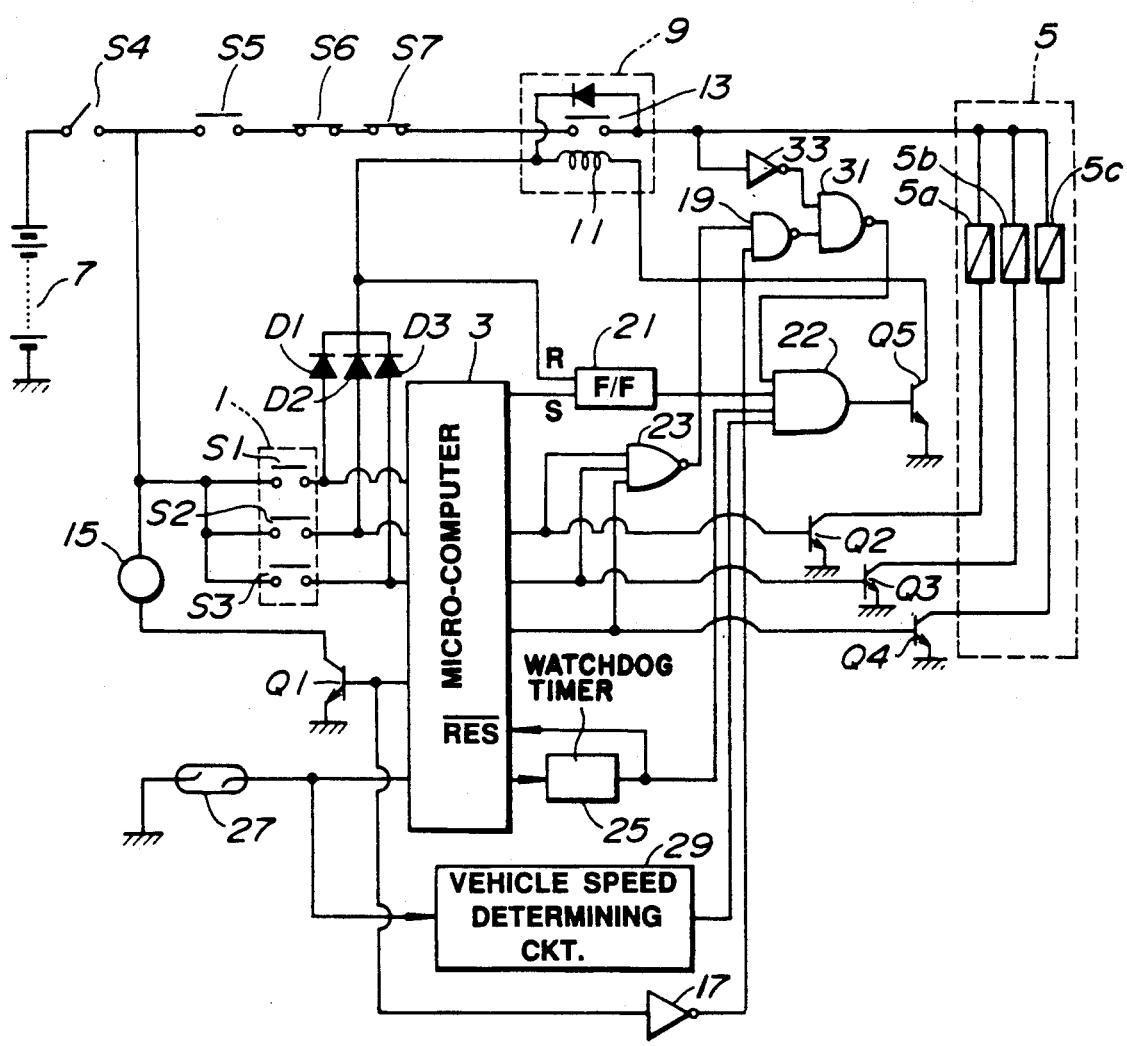
FIG. 1 is a schematic circuit wiring diagram of a system for automatically controlling a vehicle speed to a desired cruise speed according to the present invention.

Reference will hereinafter be made to the drawing in order to facilitate understanding of the resent invention.

FIG. 1 shows a preferred embodiment of a system for automatically controlling a vehicle speed to a desired cruise speed according to the present invention.

The automatic cruise speed controlling system shown in FIG. 1 includes an operation unit 1 having a group of command switches, each switch issuing a command on a cruise speed control and installed on a part of a vehicle body easy to access from the vehicle driver and a microcomputer 3 which outputs control command signals to a throttle actuator 5 to control open and close of control valves constituting the actuator 4 so that an opening angle of an engine throttle valve is adjusted in accordance with the contents of the command issued from the operation unit 1. Thus, a vehicle speed is controlled to cruise the vehicle.

In details, the operation unit 1 includes a set/cruise switch S1, acceleration switch S2, and resume switch S3. One end of each switch S1 to S3 is connected to a battery (DC voltage supply) 7 via an ignition switch S4. The ignition switch S4 is turned on when a vehicular ignition device is operated. The other end of each command switch S1 to S3 is connected to the microcomputer 3 and to a energizing coil 11 of a power supply relay 9 for controlling the power supply to the actuator 5 via a corresponding diode D1 to D3. The microcomputer 3 generally includes an I/O port, CPU, RAM, ROM, and common bus.

Next, functions of the set/cruise switch S1, acceleration switch S2, and resume switch S3 will be described below.

The set/cruise switch S1 is a switch for setting a cruise run state of the vehicle. When the set/cruise switch S1 is depressed and released (turned on and thereafter turned off) with the vehicle speed falling in a cruise run allowable range from, e.g., 50 Km/h to, e.g., 100 Km/h, the vehicle speed at the time of the release of the set/cruise speed is set as a cruise speed. The cruise control is carried out at the set cruise speed. It is noted that when the set/cruise switch is continued to be depressed, the vehicle speed is decreased due to occurrence of an engine braking according to a duration of time during which the switch S1 is depressed.

The acceleration switch S2 is a switch for operatively increasing the vehicle speed at a constant acceleration. When the vehicle cruises under the cruise speed control at a speed above a lower limit value of the cruise speed control allowable range and the acceleration switch S2 is depressed, the vehicle is accelerated and after the vehicle speed reaches another vehicle speed at which the vehicle is desired to cruise, the acceleration switch S2 is released. The cruise speed run at that another vehicle speed is carried out.

The resume switch S3 is a switch for returning to the original cruise speed before the vehicle speed reduction caused by a temporary decrease of the vehicle speed, e.g., by an application of the brake or shift range change of a vehicular transmission. When the resume switch S3 is operated after the vehicle speed is decreased due to the braking or the operation of the resume switch S2, the vehicle speed is returned to the vehicle speed before the reduction of the vehicle speed and the cruise run is restarted at that speed.

The power supply relay 9 includes contacts 13 whose one end is connected to a battery 7 via a brake switch S6 and clutch switch S7. The brake switch S6 is turned off (open) when the brake pedal is depressed and the clutch switch S7 is turned off (open) when a clutch pedal is depressed. The other end of the contacts 13 is connected to a safety valve (release valve) 5a, acceleration valve (supply valve) 5b, and an deceleration valve (air valve) 5c of the actuator 5. The actuator 5 receives the power supply from the battery 7 via the switches S4 to S7 and the power supply relay 9. Hence, with the brake system or clutch system operated under the cruise control operation, the brake switch S6 or clutch switch S7 is open so that the power supply to the actuator 5 is halted to release the cruise speed control and the power supply relay 9 is in an off hold state.

When a main switch S5 is turned on, any one of the commands on the cruise speed control is received from the command switch group 1, and the cruise speed control operation is started, the microcomputer 3 issues a cruise signal indicating the vehicle is in the cruise run state to a base of a transistor Q1. A collector of the transistor Q1 is connected between the battery 7 via the ignition switch S4 and a cruise lamp 15 illuminating when the vehicle is in the cruise run state and an emitter thereof is connected to the ground. When the cruise signal is at a high level, the transistor Q1 is conducted to illuminate the cruise lamp 15. In addition, the cruise signal outputted from the microcomputer 3 is supplied to one input terminal of a NAND gate 19 via an inverter 17.

The microcomputer 3 supplies a receipt signal indicating that one of the commands on the cruise speed control has received from the operation unit 1 to a set input terminal of an R-S flip-flop circuit (RS F/F) 21. A reset input terminal of the RS F/F 21 is connected to respective switches S1 to S3 of the operation unit 1 via corresponding diodes D1 to D3. The set input terminal of the RS F/F 21 is connected to the microcomputer 3 and the output terminal of the RS F/F 21 is connected to an input terminal of the AND gate 22. That is to say, the RS F/F 21 is reset when at least one command switch of the group of the command switches S1 to S3 is operated and the command at the high level state is supplied to the microcomputer 3. When the receipt signal is turned to the high level upon receipt of the command, a high level recognition signal indicating that the command is supplied to the microcomputer 3 and received thereby is supplied to the RS F/F 21 and set so that the output terminal of the RS F/F 21 is turned to the high level.

The microcomputer 3 supplies the control command signals to respective bases of NPN type transistors Q2, Q3, and Q4 to control an energization of the actuator 5, i.e., the safety valve 5a, acceleration valve 5b, and deceleration valve 5c. It is noted that the safety valve 5a is normally open, accelerator valve 5b is normally closed, and the deceleration valve 5c is normally open.

The transistor Q2 is connected between the safety valve 5a and ground. When the control command signal supplied to the base is turned to the high level state, a current path of a current flowing through the safety valve 5a is formed to close the safety valve 5a.

The transistors Q3 and Q4 receive the control signals from the microcomputer 3 to control open or close of the corresponding acceleration and deceleration valves 5b and 5c upon receipt of the corresponding control command signals from the microcomputer 3.

In addition, the control command signals for controlling the energization and deenergization of the actuator 5 are supplied to an input terminal of a NOR gate 23. An output terminal of the NOR gate 23 is connected to another input terminal of a NAND gate 19. When low-level control command signals are supplied to the transistors Q2 to Q4 from the microcomputer 3 and the valves 5a to 5c of the actuator 5 are all in the deenergized states so that the opening angle of the throttle valve is decreased and the output terminal of the NOR gate 23 is in the high level state.

A watchdog timer 25 for detecting operation state of the microcomputer 3 is connected to the microcomputer 3. The watchdog timer 25 serves to detect whether the microcomputer 3 executes a program normally. The watchdog timer is a timer set by the program to prevent the microcomputer 3 from looping endlessly or becoming idle because of program errors or equipment faults.

The watchdog timer 25 receives a pulse signal from the microcomputer 3 during the execution of the program, determines whether a period of the pulse signal falls in a predetermined range, and outputs a determination signal to the microcomputer 3 or AND gate 22. That is to say, in a case when the pulse signal has the predetermined period, the output signal of the watchdog timer 25 is turned to the high level. When the watchdog timer 25 outputs the low-level reset signal due to the pulse signal being out of the predetermined period to the reset terminal RES of the microcomputer 3 to reset the microcomputer 3. The microcomputer 3 is then maintained in the optimum operation state.

The microcomputer 3 is connected to a vehicle speed sensor 27 for measuring a current vehicle speed in accordance with a speed indicative pulse signal derived from the vehicle speed sensor 27. A vehicle speed determining circuit 29 is connected to the vehicle speed sensor 27 for determining whether the current vehicle speed falls in the above-described cruise speed control allowable range. If the current vehicle speed is within the cruise speed control allowable range, the high-level determination signal is supplied to the AND gate 22. On the other hand, if the current vehicle speed detected by the vehicle speed sensor 27 is out of the cruise speed control allowable range, the low-level determination signal is supplied to the AND gate 22.

The NAND gate 19 takes a negative logic product of the outputs of both inverter 17 and NOR gate 23 and supplies the result of the negative AND to an input terminal of NAND gate 31. The other input terminal of NAND gate 31 is connected to an output terminal of an inverter 33 and the input terminal of the inverter 33 is connected to a connecting point between the relay 9 and actuator 5. The output terminal of the NAND gate 31 is connected to an input terminal of the AND gate 22.

That is to say, when the output signal level is in the high level state with the power supply relay 9 in the unconducted state, the open command to the actuator 5 is outputted from the microcomputer 3 and the output signal of the NOR gate 23 is in the high level state. At this time, when the cruise signal is in the low level state, the output signal of the inverter 17 is in the high level state. The output signal of the NAND gate 19 is then turned to the low level state and therefore the output signal of the NAND gate 31 is turned to the high level state.

Hence, in a case where the microcomputer 3 is enabled to operate, the control command signals supplied to all transistors Q2 to Q4 are first all in the low-level states. Then, since the above-described states occur immediately before the transfer from the cruise release state to the cruise state, the cruise signal is turned to the low level and the output terminal of the NAND gate 31 is in the high level state. On the other hand, with the power supply relay 9 in the conduct state and the output signal of the inverter 33 in the low level state, the cruise signal is in the high level state and the control command signal of the transistors Q2 to Q4 is turned to the high level state. If the microcomputer 3 is not in the operable state, the output signal of the NAND gate 31 is turned to the low level state.

The AND gate 22 takes a logic AND of the above-described signals and its output terminal of the AND gate 22 is connected to the base of NPN type transistor Q5 connected between the other end of the coil 11 constituting the power supply relay 9 and ground for controlling the power supply to the coil 11. Hence, the power supply to the coil 11 of the power supply relay 9 is controlled by conducting the transistor Q5 through the output signal of the AND gate 22. That is to say, the AND gate 22 receives determination factors to determine whether the control valves 5a to 5c of the actuator 5 receives the power supply, namely, the output signals of R/S flip-flop circuit 21, watchdog timer 25, vehicle speed determining circuit 29, and NAND gate 31. Then, only when all of these output signals indicate the enable of the cruise speed run, the AND gate 22 conducts the transistor Q5 so that an energization current flows through the coil 11 of the power supply relay 9 to hold the power supply relay 9 in the on state so that the power supply to the actuator 5 is enabled.

Next, an operation of the preferred embodiment shown in FIG. 1 will be described.

The microcomputer 3 receives one of the command signals from the operation unit 1 and executes the cruise speed control. During the cruise speed control run, the brake switch S6 or clutch switch S7 is open due to the operation of the brake pedal or clutch pedal so that the power supply to the actuator 5 is halted and the power supply relay 9 is in the off hold state. The cruise control is released.

Then, when the brake switch S6 or clutch switch S7 is closed due to an inoperation state of the brake pedal or clutch pedal, the vehicle speed falls in the cruise speed control allowable range, the determination signal from the vehicle speed determining circuit 29 is in the high level state, and the microcomputer 3 operates normally, the AND gate 22 outputs the high level signal. That is to say, the condition of the high level output of the AND gate 22 is such that the cruise signal is in the low level state, the output signal of the inverter 17 is in the high level state, the reset signal of the watchdog timer 25 is in the high level state, the control signals to conduct the transistors Q2 to Q4 are all in the low level states, all control valves 5 are deenergized, the output signal of the NOR gate 23 are in the high level state, the command from at least one of the command switches S1 to S3 is supplied to the microcomputer 3, the microcomputer 3 outputs the high-level receipt signal to the RS F/F 21 in response to the command, and the recognition signal derived from the RS F/F 21 is turned to the high level.

Thus, the transistor Q5 becomes conductive, the energization current flows through the coil 11 of the power supply relay 13 via the operated command switch S1 to S3 from the power supply (battery 7) so that the power supply relay 13 is held in an on state. Thus, the power supply to the control valves 5 is carried out to execute the cruise speed control.

It is noted that the relationship between the opening angle of the throttle valve, the current vehicle speed V and set cruise speed $V_s$, and the control valves 5a to 5c will be described below.

(1) $V_s > V$—In this case, the contents of the control command signals derived from the microcomputer indicates all "1"s so that the safety valve 5a is closed, the air pressure (compressed air) valve 5b is open, and the air valve 5c is closed, and a diaphragm is displaced so as to open the throttle valve, and consequently the vehicle speed V is increased.

(2) $V_s = V$—In this case, the content of the control command signals indicate that only the acceleration valve 5b is closed, safety valve 5a and air valve 5c are open so that the opening angle of the throttle valve remains at a constant angle.

(3) $V_s > V$—In this case, the contents of the control command signals derived from the microcomputer 3 indicate that the safety valve 5a is closed, the air pressure supply valve is closed, and the air valve 5c is open so that the opening angle of the throttle valve is closed to decrease the vehicle speed V.

(4) The brake switch S6 or clutch switch S7 is open—In this case, the contents of the control command signals are all "0"s so that all valves 5a to 5c are deenergized, the opening angle of the throttle valve is decreased, and the cruise speed control described above is released.

When the plurality of determination factors, i.e., the outputs of the RS F/F 21, NOR gate 23, watchdog timer 25, the vehicle speed determining circuit 29, and inverter 17 are in the low level states, the output signal of the AND gate 22 is turned to the low level to render the transistor Q5 in the unconducted state. Thus, the energization current to the coil 11 is not supplied and the power supply relay 9 remains in the off hold state. In addition, since at this time the power supply to the control valves 5 (5a to 5c) is halted, the normal run using an accelerator pedal can be carried out.

Since, in the system and method for automatically controlling a vehicle speed to a desired cruise speed according to the present invention, when at least one of the plurality of determining factors to determine whether the microcomputer 3 can execute the cruise speed control does not satisfy a condition to enable the cruise control run, the power supply to the actuator 5 is inhibited, a more safe and stable run of the vehicle can be achieved with the system.

The present invention is also applicable to an automatic transmission mounted vehicle and, in this case, a cut relay and inhibitor switch are used in place of the brake switch and clutch switch.

It will fully be appreciated by those skilled in the art that the foregoing description is made in terms of the preferred embodiment and various changes and modifications may be made without departing from the scope of the present invention which is to be defined by the appended claims.

What is claimed is:

1. A method for automatically controlling a vehicle speed to a desired cruise speed, comprising the steps of:
    (a) detecting the current vehicle speed;

(b) operatively outputting command signals on a cruise speed run of the vehicle, respectively;

(c) providing a microcomputer, responsive to any one of the command signals, for outputting a control command signal through each of a plurality of output ports thereof according to the corresponding one of the contents of the command signals, the microcomputer outputting a cruise signal through another output port together with the control command signals and outputting a receipt signal through still another output port upon receipt of any one of the command signals;

(d) providing a plurality of control valves for, with a power supply therefor being received, adjusting an operating variable of a vehicular engine driving force adjusting mechanism according to the contents of the control command signals outputted from the microcomputer via the respective output ports so that the current vehicle speed is controlled in accordance with the corresponding one of the contents of the command signals;

(e) determining whether any one of the command signals is outputted and thereafter the microcomputer outputs the receipt signal through the still other output port;

(f) determining whether the microcomputer falls in a cruise speed control enable state on the basis of a plurality of determining factors, the factors determining that the microcomputer enables the cruise speed control and the factors including the determination result in the step (e) that any one of the command signals is outputted and thereafter the microcomputer outputs the receipt signal through the still other output port; and (g) enabling the power to be supplied to the control valves only when all of the determining factors satisfy a condition of enabling the power to be supplied to the control valves to execute a cruise speed control via the control valves.

2. A system for a vehicle, comprising:

(a) first means for detecting a current vehicle speed;

(b) second means having a plurality of command switches for operatively outputting command signals on a cruise speed run of the vehicle, respectively;

(c) a microcomputer, responsive to any one of the command signals from the second means, for outputting a control command signal through each of a plurality of output ports thereof according to the corresponding one of the contents of the command signals, the microcomputer outputting a cruise signal through another output port together with the control command signals and outputting a receipt signal through still another output port upon receipt of any one of the command signals from the second means;

(d) fourth means having a plurality of control valves for, with a power supply therefor being received, adjusting an operating variable of a vehicular engine driving force adjusting mechanism according to the contents of the control command signals outputted from the microcomputer via the respective output ports so that the current vehicle speed is controlled in accordance with the corresponding one of the contents of the command signals from the second means;

(e) fifth means for determining whether any one of the command signals is outputted from the second means and thereafter the microcomputer outputs the receipt signal through the still other output port;

(f) sixth means for determining whether the microcomputer falls in a cruise speed control enable state on the basis of a plurality of determining factors, the factors determining that the microcomputer enables the cruise speed control and the factors including the determination result by the fifth means that any one of the command signal is outputted and thereafter the microcomputer outputs the receipt signal through the still other output port; and (g) seventh means for enabling the power to be supplied to the fourth means only when all of the determining factors satisfy a condition of enabling the power to be supplied to the fourth means to execute a cruise speed control via the fourth means and for disabling the power to be supplied to the fourth means when at least one of the determining factors does not satisfy the condition.

3. A system as set forth in claim 2, wherein the second means includes a first command switch through which the current vehicle speed is set as a cruise speed at which the vehicle is desired to cruise and which outputs a first command signal to command the contents thereof, a second command switch through which the current cruise speed set through the first switch is increased at a constant change rate of the vehicle speed to another cruise speed at which the vehicle is desired to cruise and which outputs a second command signal to command the contents thereof, and a third command switch through which the current vehicle speed is again returned to the original cruise speed before a system operation is released and which outputs a third command signal to command the contents thereof.

4. A system as set forth in claim 3, wherein the fifth means includes a flip-flop circuit whose reset terminal is connected to each of the first, second, and third command switches via a plurality of diodes and whose set terminal is connected to the microcomputer for outputting a low-level signal upon receipt of any one of the first, second, and third command signals from the reset terminal and thereafter outputting a high-level signal upon receipt of the receipt signal from the set terminal.

5. A system as set forth in claim 4, which further comprises eighth means connected to the first means for determining whether the current vehicle speed falls in a cruise speed control allowable range and outputting a high-level signal when determining that the current vehicle speed falls in the cruise speed control allowable range, the eighth means providing one of the determining factors indicated by the high-level output signal thereof.

6. A system as set forth in claim 5, which further comprises ninth means for determining whether the microcomputer operates normally and outputting a high-level signal when determining that the microcomputer normally operates, the ninth means providing one of the determining factors indicated by the high-level signal thereof.

7. A system as set forth in claim 6, which further comprises tenth means for determining whether the cruise signal is not outputted from the microcomputer via the other output port and all control command signals are at low-level states indicating that none of the control valves is energized and outputs a high-level signal when determining that the cruise signal is not outputted from the microcomputer via the other output port and all control command signals are at low-level states indicating that none of the control valves is energized, the tenth means providing one of the determining factors indicated by the high-level signal thereof.

8. A system as set forth in claim 7, wherein the sixth means includes an AND gate receiving the output signals from the fifth means, eighth means, ninth means, and tenth means and outputting a high level signal only when the output signals of the fifth means, eighth means, ninth means, and tenth means indicate the high-level signals and a transistor which is conductive when receiving the high-level signal from the AND gate so that a power supply relay coil portion is energized via one of the diodes of the fifth means and the power to the control valves is supplied to the control valves.

9. A system as set forth in claim 8, wherein the power supply relay is held in an on state when the coil portion thereof is energized and held in an off state when the coil portion thereof is deenergized.

10. A system as set forth in claim 9, which further comprises a brake switch connected between the power supply and a contact portion of the power supply relay which opens when a brake system of the vehicle is operated.

11. A system as set forth in claim 10, which further comprises a clutch switch connected in series between the brake switch and the contact portion of the power supply relay which opens when a clutch system of the vehicle is operated.

12. A system as set forth in claim 11, which further comprises eleventh means for determining whether a current derived from the power supply passed through the power supply relay contact portion is not received thereby and outputting a high-level signal to the tenth means so that the tenth means outputs a low-level signal to the AND gate, the AND gate outputs a low-level signal to the transistor, and the transistor is not conductive to deenergize the power supply relay coil portion.

13. A system as set forth in claim 12, wherein the eighth means comprises a vehicle speed determining circuit which outputs the high-level signal to the AND gate when the current vehicle speed detected by the first means falls in the cruise speed control allowable range and outputs a low-level signal when the current vehicle speed falls out of the cruise speed control allowable range.

14. A system as set forth in claim 12, wherein the ninth means comprises a watchdog timer which outputs a reset signal to the microcomputer and to the AND gate to reset the microcomputer when the microcomputer operates abnormally and outputs the high-level signal to the AND gate when the microcomputer normally operates.

15. A system as set forth in claim 12, wherein the tenth means comprises a NOR gate whose input ends are connected to the respective output ports of the microcomputer and which outputs the high-level signal only when the contents of all control command signals are low-levels, an inverter which outputs the high-level signal when no cruise signal is outputted from the microcomputer, a first NAND gate which outputs the low-level signal only when both signals derived from the NOR gate and inverter indicate the high-level states, and a second NAND gate which outputs the low-level signal to the AND gate only when both signals derived from the first NAND gate and the eleventh means indicate the low-level states.

16. A system as set forth in claim 15, wherein the eleventh means is an inverter.

* * * * *